United States Patent [19]

Motogami et al.

[11] Patent Number: 5,159,001

[45] Date of Patent: Oct. 27, 1992

[54] ION-CONDUCTIVE POLYMER ELECTROLYTE

[75] Inventors: Kenji Motogami, Takatsuki; Shigeo Mori, Kyoto, both of Japan

[73] Assignee: Dai-Ichi Kogyo Seiyaku Co., Ltd., Kyoto, Japan

[21] Appl. No.: 707,153

[22] Filed: May 29, 1991

[30] Foreign Application Priority Data

May 31, 1990 [JP] Japan ................. 2-143697

[51] Int. Cl.$^5$ .................. C08J 3/24; C08K 5/42; C08L 57/10
[52] U.S. Cl. ................... 524/157; 524/439; 524/440
[58] Field of Search ............ 524/439, 440, 157

[56] References Cited

U.S. PATENT DOCUMENTS 4,750,817 6/1988 Sammells ................ 359/270

FOREIGN PATENT DOCUMENTS

145498A3 6/1985 European Pat. Off.
331342A2 9/1989 European Pat. Off.
59-189171A 10/1984 Japan.
136408 6/1988 Japan.

OTHER PUBLICATIONS

British Polymer Journal, vol. 20, No. 3, (1988) pp. 253-268.
European Search Report.

Primary Examiner—Paul R. Michl
Assistant Examiner—U. K. Rajguru
Attorney, Agent, or Firm—Morgan & Finnegan

[57] ABSTRACT

An ion-conductive polymer electrolyte comprises an organic polymer, a soluble electrolyte salt and an organic solvent. The organic polymer is the compound obtained by crosslinking an organic compound having a structure of the following general formula (1);

$$Z-[(A_m-X_p)-Y]_k \qquad (1)$$

in which Z is a residue of a compound having at least one active hydrogen, Y is an active hydrogen group or polymerizable functional group, m is an integer of 1 to 250, k is an integer of 1 to 12, A is a structure of the following general formula (2);

$$\begin{array}{c}-(CH_2-CH-O)-\\ \phantom{-(CH_2-}|\\ \phantom{-(CH_2-}CH_2-O-(CH_2-CH_2-O)_nR\end{array} \qquad (2)$$

wherein n is an integer of 0 to 25, R is an alkyl, alkenyl, aryl or alkylaryl group having 1 to 20 carbon atoms, X is $-(CH_2-CH_2-O)-$, and p is 0 or an integer of 1 to 450, and, when p is not 0, A and X are block-copolymerized, m shows the total number of copolymerized A units and p shows the total number of copolymerized X units.

8 Claims, No Drawings

ION-CONDUCTIVE POLYMER ELECTROLYTE

BACKGROUND OF THE INVENTION

This invention relates to an ion-conductive polymer electrolyte.

As an ion-conductive polymer electrolyte, there has been known following compounds. For example, an organic polymer electrolyte of polyethylene oxide (PEO) type; an organic polymer electrolyte having a multifunctional polyether molecular structure prepared by a randam copolymerization of ethylene oxide portion and propylene oxide portion (Japanese Laid-Open Patent Publication No. 249,361 of 1987); a solid polymer electrolyte comprising an ethylene oxide copolymer containing an ionic compound in dissolved state (Japanese Laid-Open Patent Publication No. 83,249 of 1986); and an ion-conductive polymer electrolyte in which a high polymer solid substance having plasticity is further constituted substantially with a branched-chain of a homopolymer or copolymer which is thermoplastic and has no crosslinkage (Japanese Laid-Open Patent Publication No. 98,480 of 1980).

However, those conventional ion-conductive polymer electrolytes have the following problems.

First, the organic polymer electrolyte of polyethylene oxide type shows a relatively good lithium-ion conductivity in the temperature range of not lower than 40° C., but the characteristic is lowered rapidly at the room temperature range of about 25° C. Accordingly, it is difficult that the electrolyte is used for various electric applications.

The organic polymer electrolytes described in Japanese Laid-Open Patent Publication No. 249,361 of 1987 do not show rapid lowering of the lithium-ion conductivity at the room temperature range of about 25° C., but the lowering proceeds at a temperature of not higher than 0° C. which is considered as a practical temperature range. Therefore, a practical ion-conductivity can not be obtained.

The organic polymer electrolyte described in Japanese Laid-Open Patent Publication No. 83,249 of 1986 is an organic polymer prepared by a random-copolymerization of ethylene oxide with the other monomer. The structure of the organic polymer resultantly becomes amorphous as a result by the random-copolymerization, but the product quality tends to be unstable since the structure of the organic polymer does not become amorphous sufficiently.

Further, since the organic polymer electrolyte described in Japanese Laid-Open Patent Publication No. 98,480 of 1980 is thermoplastic, a film formed with it is limited only to be simple and a good adhesion of the film can not be obtained.

The object of the present invention is to solve such problems as described above and to provide an ion-conductive polymer electrolyte which shows an excellent and stable ion conductivity at low temperature and can be easily handled.

SUMMARY OF THE INVENTION

The ion-conductive polymer electrolyte according to the present invention is characterized in comprising an organic polymer, a soluble electrolyte salt and an organic solvent, wherein said organic polymer is the compound obtained by crosslinking an organic compound having a structure of the following general formula (1);

$$Z-[(A_m-X_p)-Y]_k \quad (1)$$

in which Z is a residue of a compound having at least one active hydrogen, Y is an active hydrogen group or polymerizable functional group, m is an integer of 1 to 250, k is an integer of 1 to 12, A is a structure of the following general formula (2);

$$-(CH_2-\underset{\underset{CH_2-O-(CH_2-CH_2-O)_nR}{|}}{CH}-O)- \quad (2)$$

wherein n is an integer of 0 to 25, R is an alkyl, alkenyl, aryl or alkylaryl group having 1 to 20 carbon atoms, X is $-(CH_2-CH_2-O)-$, and p is 0 or an integer of 1 to 450, and, when p is not 0, A and X are block-copolymerized, m shows the total number of copolymerized A units and p shows the total number of copolymerized X units.

The organic polymer may be obtained by crosslinking the compound having a structure of the formula (1) either with or without a crosslinking agent.

DETAILED DESCRIPTION OF THE INVENTION

The organic compound having a structure of the general formula (1) which is used as a material for the organic polymer can be obtained by the method in which an active hydrogen compound is reacted with glycidyl ethers solely or together with ethylene oxides to obtain a polyether compound and then, if necessary, the polyether compound is reacted with a compound having a polymerizable functional group to introduce the polymerizable functional group to the end active hydrogen of the main chain of said ethylene oxides. Generally, the average molecular weight of the organic compound is not more than 20,000 preferably.

As the active hydrogen compounds, there are exemplified the following compounds; such as polyhydric alcohols, e.g., methanol, ethanol, ethylene glycol, propylene glycol, 1,4-butanediol, glycerol, trimethylolpropane, sorbitol, sucrose, polyglycerol and the like; amine compounds, e.g., butylamine, 2-ethyl hexylamine, ethylenediamine, hexamethylenediamine, diethylenetriamine, triethylenetetramine, tetraethylenepentamine, pentaethylenehexamine, aniline, benzylamine, phenylenediamine and the like; phenolic active hydrogen compounds, e.g., Bisphenol A, hydroquinone, novolak and the like; the compound having foregin active hydrogen groups in one molecule, e.g., monoethanolamine, diethanolamine and the like. Among them, polyhydric alcohols are particularly preferred.

Next, as the glycidyl ethers to be reacted with the active hydrogen compounds, there are exemplified the following compounds; such as alkyl-, alkenyl-, aryl- or alkylaryl-polyethylene glycol glycidyl ethers represented by the following formula;

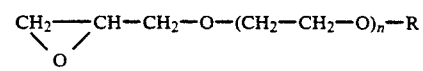

wherein n is an integer of 0 to 25, R is an alkyl, alkenyl, aryl or alkylaryl group having 1 to 20 carbon atoms. The typical compounds are represented by the above formula in which R is a straight chain alkyl such as methyl, ethyl, butyl and the like; branched alkyl such as isopropyl, sec-butyl, tert-butyl and the like; alkenyl such as vinyl, allyl, 1-propenyl, 1,3-butadienyl and the like; aryl or alkylaryl such as phenyl, nonylphenyl, tolyl, benzyl and the like. Particularly, the compounds represented by the above formula in which n is an integer of 1 to 15 and R has 1 to 12 carbon atoms are preferably used.

As the catalysts which may be used in the reaction, there are generally exemplified basic catalysts such as sodium methylate, sodium hydroxide, potassium hydroxide, lithium carbonate and the like. However, acidic catalysts such as boron trifluoride and the like; amine catalysts such as trimethylamine, triethylamine and the like are also useful. The used amount of the catalyst is arbitrary.

As described above, the organic compound used in the present invention may be the compound obtained by the method in which an active hydrogen compound is reacted with glycidyl ethers solely, or the compound obtained by the method in which an active hydrogen compound is reacted with a block-copolymer of glycidyl ethers and ethylene oxides. In any event, the addition molar number of glycidyl ethers is preferably 1 to 250 mole per one active hydrogen of the active hydrogen compound and the mole number of ethylene oxides block-copolymerized with glycidyl ethers is preferably 1 to 450 mole per one active hydrogen. When glycidyl ethers and ethylene oxides are block-copolymerized, the blocked position and unit number of each compound are not particularly limited. However, it is preferable that the addition mole number is appropriately selected in such a way that an average molecular weight of the organic compound is not more than 20,000.

Further, the crosslinking reaction of the organic compounds in which the end group Y of the main chain is an active hydrogen group may be carried out by using a crosslinking agent.

As the crosslinking agents, there are exemplified the following compounds; such as 2,4-tolylene diisocyanate (2,4-TDI), 2,6-tolylene diisocyanate (2,6-TDI), 4,4'-diphenylmethane diisocyanate (MDI), hexamethylene diisocyanate (HMDI), isophorone diisocyanate, triphenylmethane diisocyanate, tris(isocyanatephenyl)thiophosphate, lysine ester triisocyanate, 1,8-diisocyanate-4-isocyanatemethyl octane, 1,6,11-undecane triisocyanate, 1,3,6-hexamethylene triisocyanate, bicycloheptane triisocyanate, buret-bonded HMDI, isocyanurate-bonded HMDI, an adduct of trimethylolpropane with 3 moles of TDI, and the mixture thereof.

When an isocyanate compound is used as the crosslinking agent, it is generally used in such an amount as the number of isocyanate group becomes 1 to 1.5 times of the number of the active hydrogen groups in the end of the main chain of the organic compound.

Further, to complete rapidly the crosslinking reaction, it is preferred to use a catalyst. Among the catalysts, there are included such as organic metal catalyst, e.g., dibutyltin dilaurate (DBTDL), dibutyltin diacetate (DBTA), phenyl mercury salt of propionic acid, lead octenate and the like; amine catalysts, e.g., triethylenediamine, N,N'-dimethylpiperazine, N-methylmorpholine, tetramethyl guanidine, triethylamine and the like.

Furthermore, when the end group Y of the main chain is a polymerizable functional group, the polymerizable functional group is introduced to the end of the main chain of the polyether compound obtained by the reaction of the active hydrogen compound with glycidyl ethers or with glycidyl ethers and ethylene oxides.

Among the polymerizable functional groups, there are included an alkenyl such as vinyl and the like; an group having an unsaturated bond such as acryloyl, methacryloyl and the like; a group having straight chain and cyclic portion containing Si and the like. These groups are introduced into the molecule by reacting the above polyether compound with a compound having the polymerizable functional group.

As the compounds having the polymerizable functional group, there are exemplified the following compounds; a compound having a carboxyl group and unsaturated bond in one molecule such as acrylic acid, methacrylic acid, cinnamic acid, maleic acid, fumaric acid, itaconic acid, p-vinyl benzoic acid and the like; and/or an anhydride of the above compound such as maleic anhydride, itaconic anhydride and the like; and/or an acid chloride of the above compound; glycidyls such as allyl glycidyl ether, glycidyl methacrylate and the like; isocyanates such as methacryloyl isocyanate and the like; a Sicontaining compound such as dichlorosilane, dimethylvinylchlorosilane and the like.

These organic compounds are crosslinked by the polymerization reaction. The polymerization reaction may be carried out with light, heat, electronic ray or the like. If necessary, a polymerization initiator and/or a sensitizer may be used.

Further, as the soluble electrolyte salt doped into the organic compound thus obtained, there are exemplified the following compounds; such as inorganic-ion salts containing at least one metal element selected from the group consisting of Li, Na, K, Cs, Ag, Cu and Mg, e.g., LiI, LiCl, LiClO$_4$, LiSCN, LiBF$_4$, LiAsF$_6$, LiCF$_3$SI$_3$, LiCF$_3$CO$_2$, LiHgI$_3$, NaI, NaSCN, NaBr, KI, CsSCN, AgNO$_3$, CuC$_{12}$Mg(ClO$_4$)$_2$ and the like; quaternary ammonium salts, e.g., (CH$_3$)$_4$NBF$_4$, (CH$_3$)$_4$NBr, (C$_2$H$_5$)$_4$NClO$_4$, (C$_2$H$_5$)$_4$NI, (C$_3$H$_7$)$_4$NBr, (n—C$_4$H$_9$)$_4$ClO$_4$, (n—C$_4$H$_9$)$_4$NI, (n—C$_5$H$_{11}$)$_4$NI and the like; organic-ion salts, e.g., lithium stearylsulfonate, sodium octylsulfonate, lithium dodecylbenzenesulfonate, sodium naphthalenesulfonate, lithium dibutylnaphthalenesulfonate, potassium octylnaphthalenesulfonate, potassium dodecylnaphthalenesulfonate and the like. These soluble electrolyte salts may be used in combination.

The used amount of the soluble electrolyte salt is 0.0001~5.0 mol, preferably 0.005~2.0 mol, per the number of ether-bond oxygen comprised in the above organic polymer. When the soluble electrolyte salt is added in too high ratio, excess of the soluble electrolyte salt such as inorganic-ion salt does not dissociate but merely is present as a mixture and resultantly the ionic conductivity is adversely lowered.

The method for doping the soluble electrolyte salt is also not restricted but it is generally convenient that the salts are dissolved in an organic solvent such as methyl ethyl ketone (MEK), tetrahydrofuran (THF) and the like and mixed with the organic polymers uniformly and then the organic solvent is removed under reduced pressure.

Next, as the organic solvent mixed with the soluble electrolyte salt in the organic polymer compound, the solvent which can dissolve the soluble electrolyte salt as solute may be used. Among the solvent, there are exemplified the following solvents; tetrahydrofuran, 2-methyl tetrahydrofuran, 1,3-dioxolan, 4,4-dimethyl-1,3-dioxolan, τ-butyrolactone, ethylene carbonate, propylene carbonate, butylene carbonate, sulfolane, 3-methyl sulfolane, tert-butyl ether, iso-butyl ether, 1,2-dimethoxy ethane, 1,2-ethoxymethoxy ethane, ethylene glycol diethyl ether and the mixture thereof. But the solvent is not limited to the above compounds.

When these solvents are mixed, the effect in which the conductivity is remarkably improved can be obtained without the change of the basic skeleton of the organic polymer compound.

The mixing ratio of the organic solvent is arbitrary and the method for mixing is not particularly limited. Among the method for mixing the organic solvent, there are exemplified the following methods; the method in which the organic solvent is added with the soluble electrolyte salt under the atmosphere of nitrogen gas in the crosslinking of the organic compound and then the crosslinking reaction is carried out to obtain the ion-conductive polymer electrolyte; the method in which the organic solvent is impregnated with the organic polymer compound to obtain the ion-conductive polymer electrolyte and the like. The organic solvent may be added before or after the crosslinking reaction.

According to the present invention, since an organic polymer electrolyte comprising monomers having the specific structure is used, the structure of the organic polymer is made to be completely amorphous. And, since the organic polymer electrolyte has the side chain as well as in the main chain, the crystallization temperature is lowered. Further, when a soluble electrolyte salt such as lithium salt is contained, the movement of the lithium cation becomes easily so that the lithium-ion conductivity in the temperature range of not higher than room temperature is improved. In this manner, an ion-conductive polymer electrolyte excellent in characteristic at low temperature and stable in quality can be obtained. Furthermore, since the organic polymer compound is thermosetting, the product having various forms can be obtained. Further, a film excellent in adhesion with the surface of the electrode can be produced and an ion-conductive polymer electrolyte able to use in practical various forms can be obtained.

PREFERRED EMBODIMENTS OF THE INVENTION

The following examples serve to illustrate the invention in more detail although the invention is not limited to the example. Each of m and p values indicated in the following examples is an average value.

EXAMPLE 1

18 of glycerol as a starting material was reacted with 990 g of methyldiethylene glycol glycidyl ether represented by the following formula

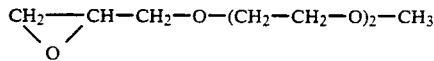

in the presence of 2 g of potassium hydroxide as a catalyst, and then the product was purified with desalting to obtain 876 g of a polyether having an average molecular weight of 4,890 (calculated by hydroxide value).

The polyether and the 1.1 equivalent weight of acrylic acid to the hydroxide number of the polyether were added to benzene the used amount of which is identical with that of the acrylic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-acrylated polyether having an average molecular weight of 5,053 and a structure of the formula ①, in which

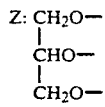

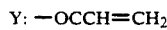

m: 9
n: 2
p: 0
R: —CH$_3$
k: 3, was confirmed by measuring the bromine value and the saponification value.

3.6 g of thus obtained terminal-acrylated polyether, 0.13 g of LiSCN (0.025 mole/ether-bond oxygen) and 1% of a polymerization initiator (2,2-azobisisobutyronitrile) were dissolved in 3 ml of methyl ethyl ketone and allowed to stand for 1 hour at 80° C. in a stream of nitrogen gas under atmospheric pressure. Then the solution was heattreated for 8 hours at the same temperature in vacuum degree of below $1 \times 10^{-3}$ Torr to remove methyl ethyl ketone, and then thus obtained film was impregnated with 2.0 g of propylene carbonate under the atmosphere of nitrogen gas, and resultantly an ion-conductive polymer electrolyte having a thickness of 48 μm was obtained.

EXAMPLE 2

20 g of sorbitol as a starting material was reacted with 1,320 g of methyltriethylene glycol glycidyl ether represented by the following formula

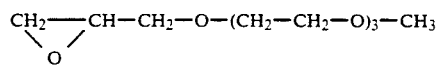

in the presence of 2.7 g of potassium hydroxide as a catalyst, and then the product was purified with desalting to obtain 954 g of a polyether having an average molecular weight of 11,760 and a structure of the formula ①, in which

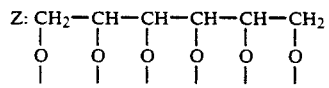

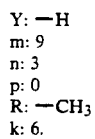

Y: —H
m: 9
n: 3
p: 0
R: —CH$_3$
k: 6.

3.6 g of thus obtained polyether, 0.12 g of LiClO$_4$ (0.01 mole/ether-bond oxygen), 1.5 equivalent weight of tolylenediisocyanate to the mole number of the polyether and 0.01 g of dibutyltin dilaurate were dissolved in 3 ml of methyl ethyl ketone and then the mixture was poured into a flat vessel. Then the solution was allowed to stand for 30 minutes at 60° C. in a stream of nitrogen gas under atmospheric pressure. Then the solution was heat-treated for 8 hours at 80° C. in vacuum degree of below $1 \times 10^{-3}$ Torr to remove methyl ethyl ketone, and then thus obtained film was impregnated with 1.8 g of propylene carbonate under the atmosphere of nitrogen gas, and resultantly an ion-conductive polymer electrolyte having a thickness of 44 μm was obtained.

EXAMPLE 3

15 of glycerol as a starting material was reacted with 2,650 g of methylhexaethylene glycol glycidyl ether represented by the following formula

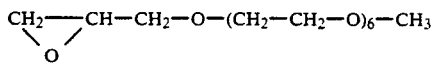

in the presence of 5 g of potassium hydroxide as a catalyst, and then the product was purified with desalting to obtain 2,160 g of a polyether having an average molecular weight of 15,260 (calculated by hydroxide value).

The polyether and the 1.1 equivalent weight of acrylic acid to the hydroxide number of the polyether were added to benzene the used amount of which is identical with that of the acrylic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-acrylated polyether having an average molecular weight of 15,422 and a structure of the formula ①, in which

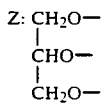

Y: —OCCH=CH$_2$
m: 14
n: 6
p: 0
R: —CH$_3$
k: 3, was confirmed by measuring the bromine value and the saponification value.

3.6 g of thus obtained terminal-acrylated polyether, 0.14 g of LiClO$_4$ (0.022 mole/ether-bond oxygen) and 1% of a polymerization initiator (2,2-azobisisobutyronitrile) were dissolved in 3 ml of methyl ethyl ketone and allowed to stand for 1 hour at 80° C. in a stream of nitrogen gas under atmospheric pressure. Then the solution was heat-treated for 8 hours at the same temperature in vacuum degree of below $1 \times 10^{-3}$ Torr to remove methyl ethyl ketone, and then thus obtained film was impregnated with 1.8 g of t-butyrolactone under the atmosphere of nitrogen gas, and resultantly an ion-conductive polymer electrolyte having a thickness of 48 μm was obtained.

EXAMPLE 4

20 of monoethanolamine as a starting material was reacted with 1,630 g of phenyldiethylene glycol glycidyl ether represented by the following formula

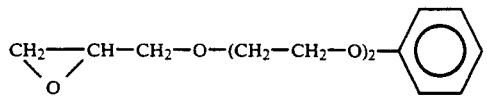

in the presence of 5.8 g of potassium hydroxide as a catalyst, and then the product was purified with desalting to obtain 1,430 g of a polyether having an average molecular weight of 4,830 (calculated by hydroxide value).

The polyether and the 1.1 equivalent weight of acrylic acid to the hydroxide number of the polyether were added to benzene the used amount of which is identical with that of the acrylic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-acrylated polyether having an average molecular weight of 4,990 and a structure of the formula ①, in which

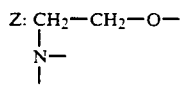

Y: —OCCH=CH$_2$
m: 7
n: 2
p: 0

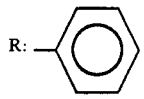

k: 3, was confirmed by measuring the bromine value and the saponification value.

3.6 g of thus obtained terminal-acrylated polyether, 0.11 g of NaClO$_4$ (0.015 mole/ether-bond oxygen) and 1% of a polymerization initiator (2,2-azobisisobutyronitrile) were dissolved in 3 ml of methyl ethyl ketone and allowed to stand for 1 hour at 80° C. in a stream of nitrogen gas under atmospheric pressure. Then the solution was heat-treated for 8 hours at the same temperature in vacuum degree of below $1 \times 10^{-3}$ Torr to remove methyl ethyl ketone, and then thus obtained film was impregnated with 1.8 g of γ-butyrolactone under the atmosphere of nitrogen gas, and resultantly an ion-conductive polymer electrolyte having a thickness of 45 μm was obtained.

EXAMPLE 5

20 of bisphenol A as a starting material was reacted with 1,140 g of methyldodecaethylene glycol glycidyl ether represented by the following formula

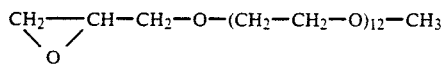

in the presence of 4.2 g of potassium hydroxide as a catalyst, and then the product was purified with desalting to obtain 1,060 g of a polyether having an average molecular weight of 12,710 (calculated by hydroxide value).

The polyether and the 1.1 equivalent weight of p-vinyl benzoic acid to the hydroxide number of the polyether were added to benzene the used amount of which is identical with that of the p-vinyl benzoic acid. The mixture was reacted by adding 0.01 mol % of sulfuric acid at a temperature of 80° to 90° C. with introducing air The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-p-vinyl benzoated polyether having an average molecular weight of 12,970 and a structure of the formula (1), in which

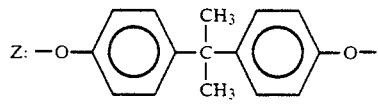

m: 10
n: 12
p: 0
R: —CH₃
k: 2.

was confirmed by measuring the bromine value and the saponification value.

3.6 g of thus obtained terminal-p-vinyl benzoated polyether, 0.10 g of NaSCN (0.015 mole/ether-bond oxygen) and 1% of a polymerization initiator (2,2-azobisisobutyronitrile) were dissolved in 3 ml of methyl ethyl ketone and allowed to stand for 1 hour at 80° C. in a stream of nitrogen gas under atmospheric pressure. Then the solution was heat-treated for 8 hours at the same temperature in vacuum degree of below $1 \times 10^{-3}$ Torr to remove methyl ethyl ketone, and then thus obtained film was impregnated with 1.8 g of ethylene carbonate under the atmosphere of nitrogen gas, and resultantly an ion-conductive polymer electrolyte having a thickness of 42 μm was obtained.

EXAMPLE 6

20 of ethylenediamine as a starting material was reacted with 2,650 g of phenylhexaethylene glycol glycidyl ether represented by the following formula

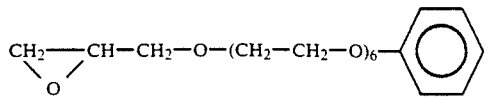

in the presence of 9.4 g of potassium hydroxide as a catalyst, and then the product was purified with desalting to obtain 2,360 g of a polyether having an average molecular weight of 7,870 (calculated by hydroxide value).

The polyether and the 1.1 equivalent weight of acrylic acid to the hydroxide number of the polyether were added to benzene the used amount of which is identical with that of the acrylic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-acrylated polyether having an average molecular weight of 8,084 and a structure of the formula (1), in which

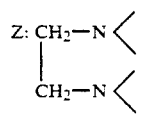

Y: —OCCH=CH₂
m: 5
n: 6
p: 0

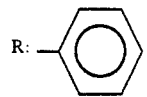

k: 4.

was confirmed by measuring the bromine value and the saponification value.

3.6 g of thus obtained terminal-acrylated polyether, 0.09 g of LiSCN (0.020 mole/ether-bond oxygen) and 1% of a polymerization initiator (2,2-azobisisobutyronitrile) were dissolved in 3 ml of methyl ethyl ketone and allowed to stand for 1 hour at 80° C. in a stream of nitrogen gas under atmospheric pressure. Then the solution was heat-treated for 8 hours at the same temperature in vacuum degree of below $1 \times 10^{-3}$ Torr to remove methyl ethyl ketone, and then thus obtained film was impregnated with 1.9 g of 1,2-dimethoxyethane under the atmosphere of nitrogen gas, and resultantly an ion-conductive polymer electrolyte having a thickness of 50 μm was obtained.

EXAMPLE 7

30 g of ethylene glycol as a starting material was reacted with 2,650 g of n-butyltriethylene glycol glycidyl ether represented by the following formula

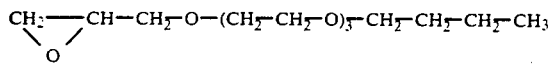

in the presence of 6.8 g of potassium hydroxide as a catalyst, and then the product was purified with desalting to obtain 2,094 g of a polyether having an average molecular weight of 3,950 (calculated by hydroxide value).

The polyether and the 1.1 equivalent weight of p-vinyl benzoic acid to the hydroxide number of the polyether were added to benzene the used amount of which is identical with that of the p-vinyl benzoic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-p-vinyl benzoated polyether having an average molecular weight of 4,203 and a structure of the formula ①, in which

Z: $-O-CH_2-CH_2-O-$

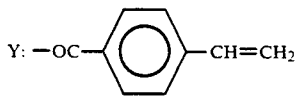

m: 7
n: 3
p: 0
R: $-CH_2-CH_2-CH_2-CH_3$
K: 2.

was confirmed by measuring the bromine value and the saponification value.

3.6 g of thus obtained terminal-p-vinyl benzoated polyether, 0.10 g of LiClO$_4$ (0.015 mole/ether-bond oxygen) and 1% of a polymerization initiator (2,2-azobisisobutyronitrile) were dissolved in 3 ml of methyl ethyl ketone and allowed to stand for 1 hour at 80° C. in a stream of nitrogen gas under atmospheric pressure. Then the solution was heat-treated for 8 hours at the same temperature in vacuum degree of below $1\times10^{-3}$ Torr to remove methyl ethyl ketone, and then thus obtained film was impregnated with 1.2 g of 1,3-dioxolan under the atmosphere of nitrogen gas, and resultantly an ion-conductive polymer electrolyte having a thickness of 48 μm was obtained.

EXAMPLE 8

30 of pentaethylenehexamine as a starting material was reacted with 1,920 g of methyltriethylene glycol glycidyl ether represented by the following formula

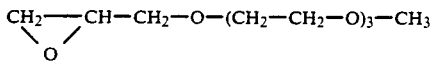

in the presence of 6.9 g of potassium hydroxide as a catalyst, and then the product was purified with desalting to obtain 1,598 g of a polyether having an average molecular weight of 13,660 (calculated by hydroxide value).

Thus obtained polyether was the compound having a structure represented by the general formula ①, in which

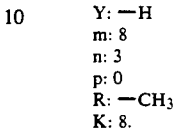

Y: $-H$
m: 8
n: 3
p: 0
R: $-CH_3$
K: 8.

3.6 g of thus obtained polyether, 0.12 g of LiClO$_4$ (0.015 mole/ether-bond oxygen), 1.5 equivalent weight of hexamethylene-diisocyanate to the mole number of the polyether and 0.01 g of dibutyltin dilaurate were dissolved in 3 ml of methyl ethyl ketone and then the mixture was poured into a flat vessel. Then the solution was allowed to stand for 30 minutes at 60° C. in a stream of nitrogen gas under atmospheric pressure. Then the solution was heat-treated for 8 hours at 80° C. in vacuum degree of below $1\times10^{-3}$ Torr to remove methyl ethyl ketone, and then thus obtained film was impregnated with 1.8 g of propylene carbonate under the atmosphere of nitrogen gas, and resultantly an ion-conductive polymer electrolyte having a thickness of 50 μm was obtained.

EXAMPLE 9

20 of ethylene glycol as a starting material was reacted with 6,250 g of methyl glycidyl ether represented by the following formula

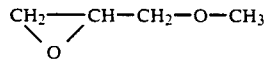

in the presence of 50 g of potassium hydroxide as a catalyst, and then the product was purified with desalting to obtain 5,970 g of a polyether having an average molecular weight of 19,020 (calculated by hydroxide value).

The polyether and the 1.1 equivalent weight of acrylic acid to the hydroxide number of the polyether were added to benzene the used amount of which is identical with that of the acrylic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-acrylated polyether having an average molecular weight of 19,160 and a structure of the formula ①, in which

| Z | $-O-CH_2-CH_2-O-$ |
|---|---|
| Y | $-O-CCH=CH_2$ |
| m | 108 |
| n | 0 |
| p | 0 |
| R | $-CH_3$ |

-continued

| k | 2, | was confirmed by measuring the bromine value and the saponification value.

3.6 g of thus obtained terminal-acrylated polyether, 0.13 g of LiClO$_4$ (0.015 mole/ether-bond oxygen number) and 1% of a polymerization initiator (2,2-azobisisobutyronitrile) were dissolved in 3 ml of methyl ethyl ketone and allowed to stand for 1 hour at 80° C. in a stream of nitrogen gas under atmospheric pressure. Then the solution was heat-treated for 8 hours at the same temperature in vacuum degree of below $1 \times 10^{-3}$ Torr to remove methyl ethyl ketone, and then thus obtained film was impregnated with 1.8 g of γ-butyrolactone under the atmosphere of nitrogen gas, and resultantly an ion-conductive polymer electrolyte having a thickness of 48 μm was obtained.

EXAMPLE 10

20 g of monoethanolamine as a starting material was reacted with 1,630 g of phenyldiethylene glycol glycidyl ether represented by the following formula

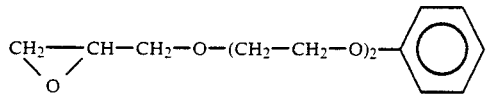

in the presence of 3 g of potassium hydroxide as a catalyst. and then the product was reacted with 192.6 g of ethylene oxide. Then, the product was purified with desalting to obtain 1,032 g of a polyether having an average molecular weight of 5,010 (calculated by hydroxide value).

The polyether and the 1.1 equivalent weight of methacrylic acid to the hydroxide number of the polyether were added to benzene the used amount of which is identical with that of the methacrylic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-methacrylated polyether having an average molecular weight of 5,215 and a structure of the formula ①, in which Z: 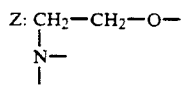

Y: —OCC(CH$_3$)=CH$_2$
m: 6.7
n: 2
p: 1.4

R: 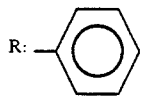

k: 3, was confirmed by measuring the bromine value and the saponification value.

3.6 g of thus obtained terminal-methacrylated polyether, 0.13 g of LiClO$_4$ (0.020 mole/ether-bond oxygen) and 1% of a polymerization initiator (2,2-azobisisobutyronitrile) were dissolved in 3 ml of methyl ethyl ketone and allowed to stand for 1 hour at 80° C. in a stream of nitrogen gas under atmospheric pressure. Then the solution was heat-treated for 8 hours at the same temperature in vacuum degree of below $1 \times 10^{-3}$ Torr to remove methyl ethyl ketone, and then thus obtained film was impregnated with 2.0 g of propylene carbonate under the atmosphere of nitrogen gas, and resultantly an ion-conductive polymer electrolyte having a thickness of 42 μm was obtained.

EXAMPLE 11

15 g of propylene glycol as a starting material was reacted with 188 g of phenyldiethylene glycol glycidyl ether represented by the following formula

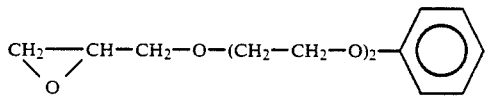

in the presence of 3 g of potassium hydroxide as a catalyst, and then the product was reacted with 3,448 g of ethylene oxide. Then, the product was purified with desalting to obtain 3,170 g of a polyether having an average molecular weight of 18,320 (calculated by hydroxide value).

The polyether and the 1.1 equivalent weight of methacrylic acid to the hydroxide number of the polyether were added to benzene the used amount of which is identical with that of the methacrylic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-methacrylated polyether having an average molecular weight of 18,448 and a structure of the formula ①, in which Z: 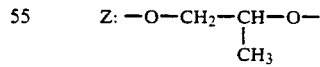

Y: —OCC(CH$_3$)=CH$_2$
m: 2.0
n: 2
p: 196.5

R: 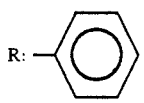

k: 2, was confirmed by measuring the bromine value and the saponification value.

3.6 g of thus obtained terminal-methacrylated polyether, 0.13 g of LiClO$_4$ (0.020 mole/ether-bond oxygen) and 1% of a polymerization initiator (2,2-azobisisobutyronitrile) were dissolved in 3 ml of methyl ethyl ketone and allowed to stand for 1 hour at 80° C. in a stream of nitrogen gas under atmospheric pressure. Then the solution was heat-treated for 8 hours at the same temperature in vacuum degree of below $1 \times 10^{-3}$ Torr to remove methyl ethyl ketone, and then thus obtained film was impregnated with 2.0 g of propylene carbonate under the atmosphere of nitrogen gas, and resultantly an ion-conductive polymer electrolyte having a thickness of 42 μm was obtained.

COMPARATIVE EXAMPLE

An ion-conductive polymer electrolyte was obtained in the same manner as described in Example 1 except that the terminal-acrylated polyether was produced by use of a random polyether comprising ethylene oxide and propylene oxide units (molar ratio 8:2) and having an average molecular weight of 3,000 instead of a polyether having an average molecular weight of 4,890, and 0.20 g of LiClO$_4$ was used instead of 0.13 g of LiSCN.

Lithium-ion conductivity test

Each of the ion-conductive polymer electrolytes obtained in Examples 1 to 9 and Comparative Example was interposed between platinum electrodes and the alternating current impedance between electrodes was measured and the complex impedance was analyzed. The results are shown in following Table 1.

TABLE 1

| | Ionic conductivity (S/cm) | | |
|---|---|---|---|
| | 20° C. | 0° C. | −20° C. |
| Example | | | |
| 1 | $4.7 \times 10^{-4}$ | $2.8 \times 10^{-4}$ | $1.3 \times 10^{-4}$ |
| 2 | $5.1 \times 10^{-4}$ | $3.1 \times 10^{-4}$ | $1.6 \times 10^{-4}$ |
| 3 | $4.0 \times 10^{-4}$ | $2.3 \times 10^{-4}$ | $9.2 \times 10^{-5}$ |
| 4 | $4.3 \times 10^{-4}$ | $2.5 \times 10^{-4}$ | $1.1 \times 10^{-4}$ |
| 5 | $4.1 \times 10^{-4}$ | $2.4 \times 10^{-4}$ | $1.0 \times 10^{-4}$ |
| 6 | $3.2 \times 10^{-4}$ | $1.5 \times 10^{-4}$ | $8.0 \times 10^{-5}$ |
| 7 | $2.0 \times 10^{-4}$ | $1.0 \times 10^{-4}$ | $7.5 \times 10^{-5}$ |
| 8 | $4.9 \times 10^{-4}$ | $3.1 \times 10^{-4}$ | $2.0 \times 10^{-4}$ |
| 9 | $3.5 \times 10^{-4}$ | $2.0 \times 10^{-4}$ | $9.8 \times 10^{-5}$ |
| 10 | $4.3 \times 10^{-4}$ | $2.3 \times 10^{-4}$ | $1.3 \times 10^{-4}$ |
| 11 | $2.1 \times 10^{-4}$ | $1.0 \times 10^{-4}$ | $7.9 \times 10^{-5}$ |
| Comparative Example | $2.5 \times 10^{-6}$ | $2.1 \times 10^{-7}$ | below $1.0 \times 10^{-8}$ |

As can be seen from Table 1, it is found that the ion-conductive polymer electrolyte according to the present invention shows good ionic conductivity, the superiority of the ionic conductivity becomes greater as the temperature is lowered, and the higher lithium-ion conductivity can be obtained even if the doped amount of the soluble electrolyte salt such as LiClO$_4$ and the like is small.

The ion-conductive polymer electrolyte according to the present invention shows good ionic conductivity stably. Further, the ion-conductive polymer electrolyte can be converted into the products having various forms and is very excellent in practicality, since it can be made amorphous. Furthermore, the ion-conductive polymer electrolyte according to the present invention is excellent in safety and available with simple operation, since it can be crosslinked without using a crosslinking agent.

What is claimed is:

1. An ion-conductive polymer electrolyte comprising an organic polymer, a soluble electrolyte salt and an organic solvent, characterized in that said organic polymer is obtained by crosslinking an organic compound having a structure of the following general formula 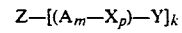;

$$Z-[(A_m-X_p)-Y]_k \qquad (1)$$

in which Z is a residue of a compound having at least one active hydrogen, Y is an active hydrogen group or polymerizable functional group, m is an integer of 1 to 250, k is an integer of 1 to 12, A is a structure of the following general formula (2);

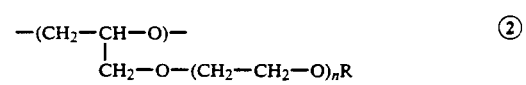

wherein n is an integer of 0 to 25, R is an alkyl, alkenyl, aryl or alkylaryl group having 1 to 20 carbon atoms, X X—(CH$_2$—CH$_2$—O)—, and p is 0 or an integer of 1 to 450, and, when p is not 0, A and X are block-copolymerized, m shows the total number of copolymerized A units and p shows the total number of copolymerized X units.

2. An ion-conductive polymer electrolyte as defined in claim 1, wherein an average molecular weight of said organic polymer is not more than 20,000.

3. An ion-conductive polymer electrolyte as defined in claim 1, wherein said organic solvent is the compound having at least one oxygen atom and/or nitrogen atom in the molecular structure.

4. An ion-conductive polymer electrolyte as defined in claim 1, wherein Y of said formula (1) is an active hydrogen group and said organic polymer is obtained by the crosslinking said organic compound with a crosslinking agent.

5. An ion-conductive polymer electrolyte as defined in claim 1, wherein Y of said formula (1) is a polymerizable functional group and said organic polymer is a compound obtained by polymerizing said organic compound.

6. An ion-conductive polymer electrolyte as defined in claim 1, wherein said soluble electrolyte salt is at least one selected from the group consisting of inorganic-ion salts containing at least one metal element selected from the group consisting of Li, Na, K, Cs, Ag, Cu and Mg, (CH$_3$)$_4$NBF$_4$, (CH$_3$)$_4$NBr, (C$_2$H$_5$)$_4$NClO$_4$, (C$_2$H$_5$)$_4$NI, (C$_3$H$_7$)$_4$NBr, (n—C$_4$H$_9$)$_4$NClO$_4$, (n—C$_4$H$_9$)$_4$NI, (n—C$_5$H$_{11}$)$_4$NI, lithium stearylsulfonate, sodium octylsulfonate, lithium dodecylbenzenesulfonate, sodium naphthalenesulfonate, lithium dibutylnaphthalenesulfonate, potassium octylnaphthalenesulfonate, and potassium dodecylnaphthalenesulfonate.

7. An ion-conductive polymer electrolyte as defined in claim 1, wherein said soluble electrolyte salt is used in an amount of 0.0001∼5.0 mol per ether-bond oxygen comprised in the above organic polymer.

8. An ion-conductive polymer electrolyte as defined in claim 3, wherein said organic solvent is at least one selected from the group consisting of tetrahydrofuran, 2-methyl tetrahydrofuran, 1,3-dioxolan, 4,4-dimethyl-1,3-dioxolan, τ-butyrolactone, ethylene carbonate, propylene carbonate, butylene carbonate, sulfolane, 3-methyl sulfolane, tert-butyl ether, iso-butyl ether, 1,2-dimethoxy ethane, 1,2-ethoxymethoxy ethane and ethylene glycol diethyl ether.

* * * * *